July 18, 1967  J. W. MACPHERSON, SR  3,331,098
APPARATUS AND METHOD FOR MANUFACTURING FLOWERS AND LIKE
ARTICLES FROM PLASTIC MATERIAL
Filed Dec. 9, 1963  2 Sheets-Sheet 1
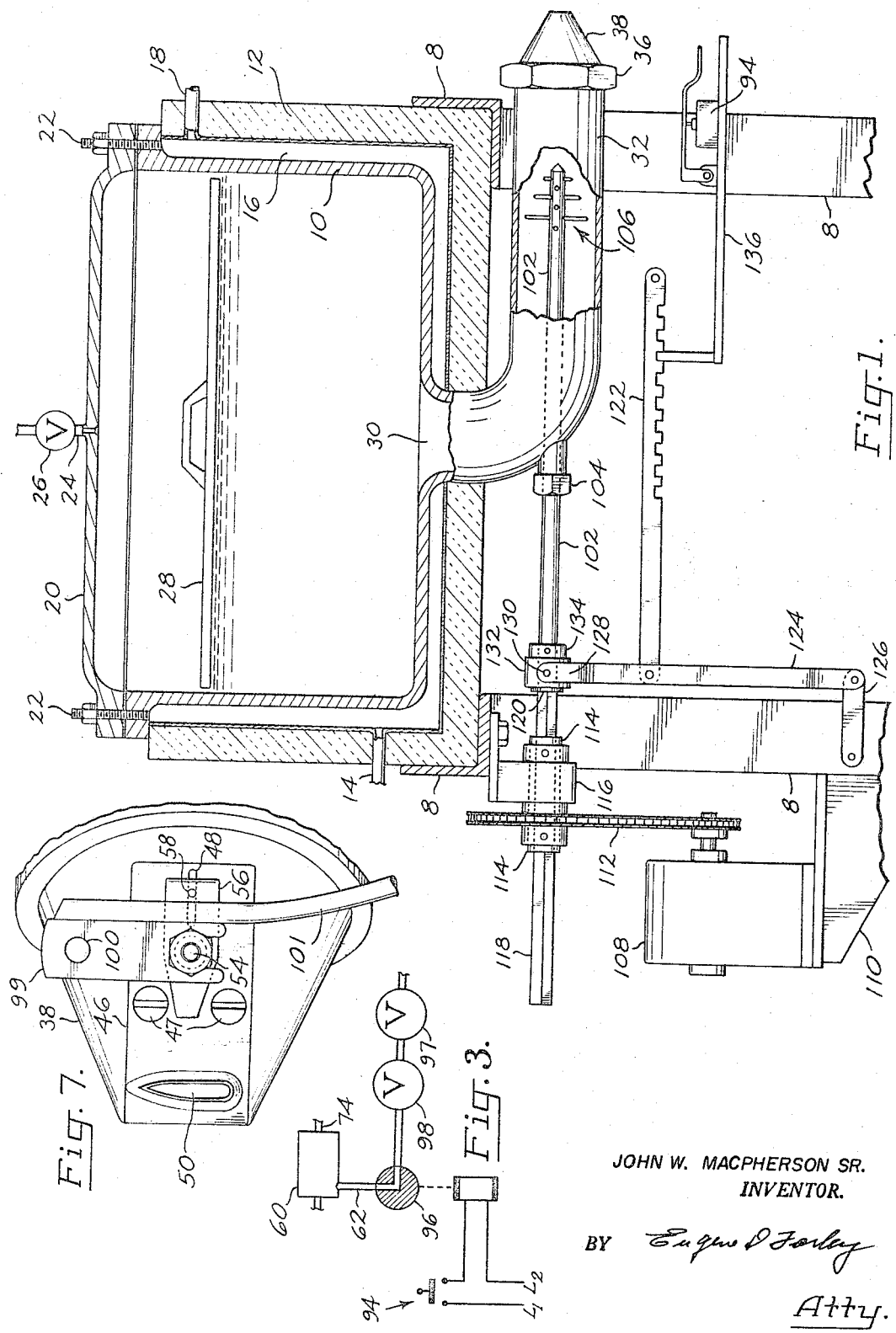
JOHN W. MACPHERSON SR.
INVENTOR.
BY Eugene D Farley
Atty.

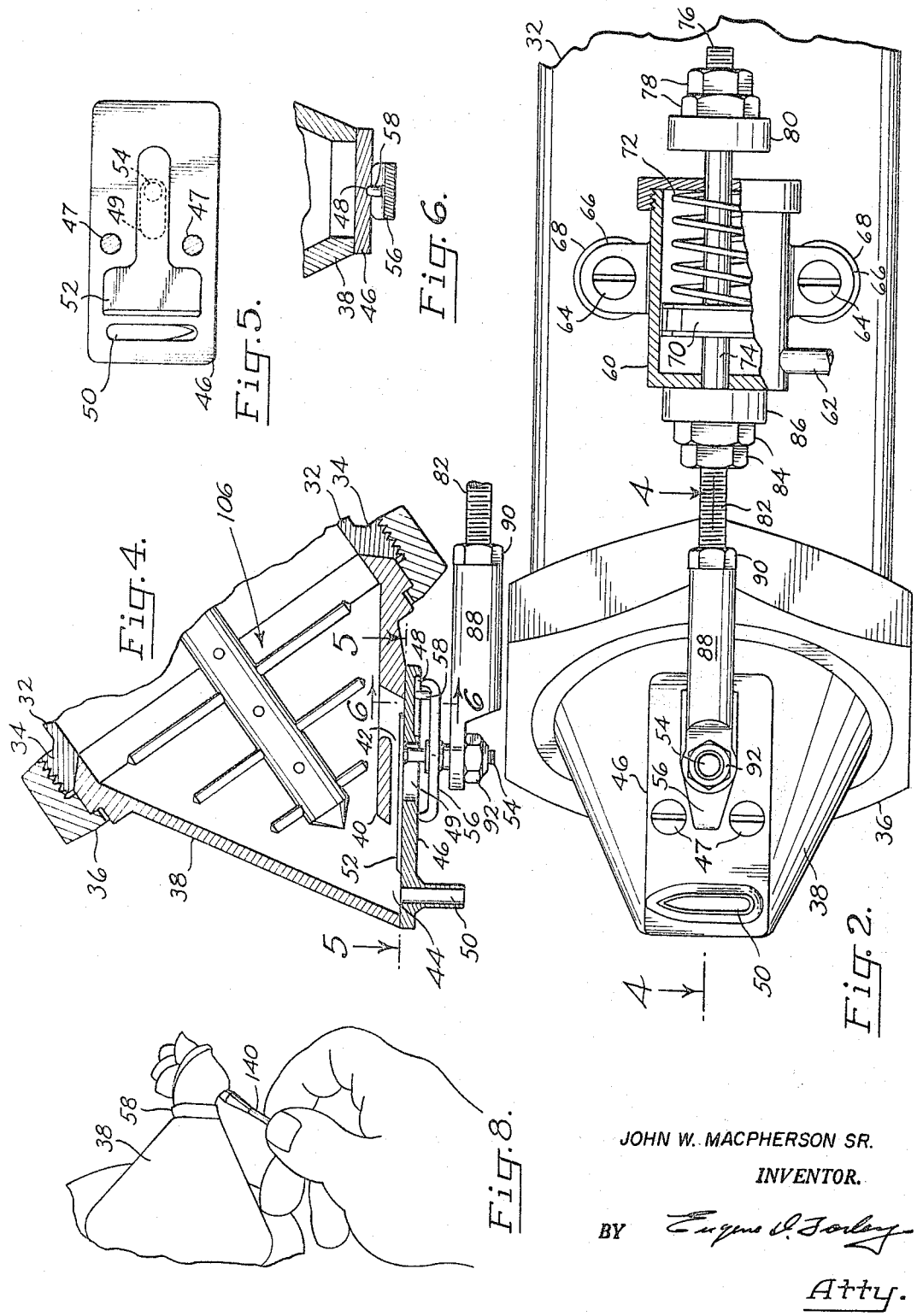

United States Patent Office 3,331,098
Patented July 18, 1967

3,331,098
APPARATUS AND METHOD FOR MANUFACTURING FLOWERS AND LIKE ARTICLES FROM PLASTIC MATERIAL
John W. Macpherson, Sr., 1107 S. K St., Tacoma, Wash. 98405
Filed Dec. 9, 1963, Ser. No. 328,944
8 Claims. (Cl. 18—1)

This invention relates to apparatus and method for manufacturing flowers and like articles from plastic materials. It pertains particularly to apparatus and method for manufacturing, from baker's icing, confectionery roses such as are used for decorations on cakes.

The traditional method of making confectionery roses for cake decoration relies upon the application of the well-known pastry bag. This comprises a compressible bag having an opening at the top for filling, and an extrusion die at the bottom. The bag is filled with a plastic material such as royal icing made from powdered sugar, egg albumen and water, mixed together in a critical extrusion consistency.

Holding the pastry bag in one hand and a tapered spindle, or rose nail, in the other hand, the rose making expert extrudes petal-forming ribbon segments of icing from the die. These are deposited one at a time on the spindle, which is held in the correct spatial attitudes and rotated to construct upon it a rose of the desired proportions.

In this sequence of operations, the pastry bag is free moving and is manipulated as required to control the shape of the rose. In other words, proper positioning of the pastry bag is primarily responsible for the angular arrangement of the ribbon segments as they are deposited one upon the other, and determines the success or failure of the rose making operation.

It will be readily apparent that considerable skill and artistic effort are required to make a presentable rose by the foregoing procedure. Royal icing classically is a temperamental material, its plastic qualities being transient with time and determined by such variable factors as the relative proportions of the ingredients employed, the temperature of extrusion, the duration of mixing, the time lag between mixing and extrusion, and other factors. These are not subject to precise control when the roses are prepared by the pastry bag method.

In addition, the manipulation of the pastry bag requires substantial physical effort which, when exerted for a considerable period of time, causes operator fatigue and affects adversely both the quality of the roses and the production rate.

Accordingly, it is the general object of this invention to provide apparatus and method for making flowers and like articles from plastic materials, which enable production of high quality flowers having sharply chiseled petal edges, with minimum effort on the part of the operator, so that a production rate of the order of 400 roses per hour per operator may be achieved. This is made possible by the provision of apparatus wherein all of the operating variables outlined above are adjusted and maintained at their optimum levels during the duration of the extruding operation, even though this may occur over a long period of time, and may be interrupted from day to day.

The manner in which the foregoing and other objects of this invention are accomplished will be apparent from the accompanying specification and claims considered together with the drawings, wherein:

FIG. 1 is a view in elevation, partly in vertical section, of the presently described flower making apparatus;

FIG. 2 is an enlarged, detail view in elevation, partly broken away, of a power operated valving mechanism for the presently described flower making apparatus; on the opposite side from that seen in FIG. 1;

FIG. 3 is a schematic diagram of the control system employed in conjunction with the valving system illustrated in FIG. 2;

FIG. 4 is a detail view in longitudinal section of the extrusion head employed in the presently described apparatus, illustrating the means employed for mixing the plastic material preliminary to its extrusion and illustrating further the valving mechanism associated with the extrusion die;

FIGS. 5 and 6 are detail sectional views, taken along lines 5—5 and 6—6 of FIG. 4;

FIG. 7 is a view in elevation, similar to FIG. 2, of a manually operated valving mechanism for the flower-making apparatus of the invention; and FIG. 8 is a perspective view illustrating the manner of employing the presently described apparatus in the manufacture of roses made from confectioner's icing.

It is the essence of the present invention that, in contradistinction to the prior art pastry bag method of making artificial flowers, wherein the pastry bag itself is the primary moving member and control of its motion the determining factor in fixing the shape and contour of the flower, the present invention provides stationary extrusion apparatus capable of a high rate of production of precisely shaped, petal-forming ribbon segments which may be built up on the flower markers' spindle solely by manipulation of the latter, its rotation and angular attitude with respect to the extrusion apparatus being adjusted as required to build up a flower product of superior quality.

A primary component of this new apparatus is a vessel adapted to contain a quantity of the chosen plastic material. The vessel is connected to gaseous or other pressure applying means for applying pressure to the material in the vessel, forcing it through a delivery outlet and into a conduit having an extrusion head connected to its outer end. Appropriately shaped die means is mounted on the extrusion head. The die means is adapted to pass plastic material and to shape it in ribbon segments of predetermined cross sectional configuration, as required to form the flower petals. Valve means work across the die means for determining the length of the ribbon segments extruded by it. The apparatus thus may be employed as a stationary dispenser of ribbon segments which may be built up on a manipulated spindle into a rose or other flower in a rapid and highly advantageous manner.

Considering the foregoing in greater detail and with particular reference to the drawings:

As shown in FIG. 1, the herein described apparatus includes a frame 8 and a vessel 10, which preferably is a pressure vessel of substantial construction and capacity. It is provided with an insulated jacket 12 so that its temperature may be controlled by circulating hot water or other heat exchange fluid through inlet pipe 14, through the space 16 intermediate vessel 10 and jacket 12, and out through discharge pipe 18.

The vessel is provided with a lid 20 secured in place by means of bolts 22. A pressure duct 24 communicates with the interior of the vessel, behind its plastic contents. Duct 24 is connected to a source of air or other gas under pressure which is fed through pressure control valve 26 into the interior of the vessel. Desirably, a pressure plate 28 may be positioned on top of the contents of the vessel to insure uniform feeding through an outlet 30 at the bottom of the vessel.

Connected to outlet 30 is a delivery conduit 32 of large diameter. The conduit preferably is L-shaped, as shown in FIG. 1. The horizontal leg of the L is of substantial length in order to provide a tempering and mixing chamber for the plastic material.

The outer end 34 of the delivery conduit is threaded and connected through the agency of a threaded coupling 36 to an extrusion head 38.

The extrusion head is generally conical in shape, although one side portion 40 is thick and flat, and provided with both a guideway 42 and an opening 44.

A die plate 46 is fastened across guideway 42 and opening 44 by means of bolts 47 which are threaded into thickened side wall 40. Guide plate 46 is formed with a guide groove 48, slot 49 and die opening 50.

In the illustrated form of the invention the die opening has a contour designed to produce a petal-forming ribbon segment of the plastic material. Accordingly, as seen particularly in FIG. 2, it is elongated vertically, relatively thick at its base portion, and tapered at its top portion as required to produce a petal having a thin, flared, upper edge.

Valve means are provided for valving through die opening 50 a sufficient amount of plastic material to produce a ribbon segment of the desired length. Although various types of valves may be employed for this purpose, a sliding gate valve has been found to be particularly satisfactory. Its construction is illustrated in FIGS. 4, 5 and 6.

The gate member of the valve assembly comprises a flat plate 52 adapted to lie flat across the inner surface of die plate 46. Its leading edge is chiseled to provide a knife edge which works across die opening 50 to sever the ribon of plastic material as it is extruded. The gate then blocks the further flow of the material pending further actuation.

Gate 52 is reciprocated through the agency of a laterally extending pin 54 which extends through slot 49 and mounts a support plate 56.

The latter plate supports and guides the valve assembly. It is provided with a pin 58 which works in groove 48. Its ends are turned inwardly and extend in sliding contact with the outer face of die plate 46. The support plate thus is spaced from die plate 46, permitting the escape of the small amount of plastic material which accumulates in slot 49. This is important since otherwise the accumulated material would dry and pack in the slot, interfering with the operation of the valve.

Reciprocative drive means is coupled to the outer end of pin 54. Although the drive means may be manual, as a suitably mounted lever, it is preferred for speed and ease of operation to provide power drive means such as is illustrated in FIGS. 2 and 3.

In its illustrated form, the drive means comprises a single-acting, fluid operated cylinder 60 actuated from a source of compressed air or other fluid under pressure applied through tube 62. The body of the cylinder is mounted on the outer side wall of delivery conduit 32 by means of bolts 64, which extend through laterally projecting ears 66 and are threaded into posts 68, the bases of which are secured to the delivery conduit.

The piston 70 of cylinder 60 is backed by compresion spring 72 and connected to a piston rod 74 which extends completely through the cylinder in an axial direction. The rear terminal portion 76 of piston rod 74 is threaded and mounts lock nuts 78, as well as damping pad 80. These members adjustably determine the degree of forward extension of piston 70 when it is pressed forwardly by spring 72 to maintain die opening 50 normally closed.

The forward end 82 of piston rod 74 also is threaded. It mounts lock nuts 84 and damping pad 86. These elements adjustably determine the extent of retraction of piston 70 when it is moved rearwardly by the application of fluid pressure through tube 62.

The stroke of the piston rod 74 thus may be maintained within limits as required to reciprocate gate 52 between a normally advanced position, wherein it seals off die opening 50, and a retracted position, illustrated in FIGS. 2 and 4, wherein it is withdrawn from the opening to permit the extrusion of plastic material.

The forward end of the piston rod is connected to pin 54 and thereby to gate 52 through the agency of a link member 88. The rearward end of the link member is threaded onto threaded section 82 of the piston rod. It is maintained in position by lock nut 90. The forward end is provided with a flattened perforated portion dimensioned to slip over pin 54 and to be retained by nut 92.

The operation of cylinder 60 is controlled electrically through a lever operated microswitch 94 located conveniently to the operator as shown in FIG. 1. The microswitch actuates a solenoid-operated valve 96 in tube 62, which, as has been indicated above, is connected to a source of fluid under pressure. A pressure regulating valve 97 and a flow regulating valve 98 are included in line 62 where they serve the usual functions.

Manually operated drive means for gate 52 is illustrated in FIG. 7. It comprises a yoked lever 99 the lower yoke end of which engages valve pin 54 and the upper end of which is pivoted to a pivot pin 100. The latter is fixed to the side wall of extrusion head 38.

A handle 101 is secured to lever 99. It extends downwardly to a position convenient to the operator, and thus affords manual means of opening and closing gate 52.

It is a particular feature of the invention that means are provided for agitating the plastic mixture at a predetermined time interval before the extrusion. This is important particularly when making decorative roses from royal icing, the consistency of which changes materially with time.

For example, under conditions of continuous operation, such an icing tends to break down and become too soft to make a satisfactory product. This difficulty may be cured by mixing it and then providing a tempering period of variable duration, depending upon the icing composition and operating conditions, before extruding it.

I have solved this problem in a highly satisfactory manner by providing in conduit 32 the long horizontal section, referred to above, and by providing in this section an efficient agitator, the position of which is longitudinally variable with respect to the conduit. Thus by varying the distance between the agitator and the extrusion die, there is provided a tempering chamber of variable length to suit the requirements of the particular operation.

This objective is achieved by the provision of a shaft 102 rotatably mounted in delivery conduit 32 coaxially with the horizontal segment thereof. The shaft extends through a packing gland 104 in the side wall of the conduit. It is provided with a toothed agitating head 106 at its inward extremity.

The shaft is driven rotatably by a motor 108 supported on a bracket 110 and connected through a chain and sprocket assembly 112 to an elongated bushing 114. The latter rotatably is mounted in a bearing 116 and is keyed to a square shaft 118. The latter shaft is aligned with agitating shaft 102 and is coupled to it end to end in a suitable manner, as by welding. Its inner end is formed with an integral flange 120, the outer surface of which forms a thrust bearing.

The drive for agitator shaft 102 thus is such as to allow longitudinal adjustment of the shaft as required to lengthen or shorten the tempering chamber portion of delivery conduit 32. The adjustment is made through a lever system illustrated particularly in FIG. 1.

A horizontal arm 122 having along its underside a plurality of spaced notches is connected pivotally at one of its ends to an intermediate point of a vertical lever 124. The lower end of the vertical lever is pivoted to the outer end of a second horizontal lever 126. The inner end of lever 126 in turn is pivoted to frame 8.

The upper end of vertical lever 124 carries a yoke 128 which is pivotally connected through pin 130 to a collar 132 mounted on agitator shaft 102. There it is retained in position between flange 120 on square shaft 118 and a set collar 134 on the end of shaft 102.

By moving notched lever 122 endwise, an angular movement is induced in vertical lever 124 which moves the entire agitating assembly including shaft 102, spiked head 106 and square shaft 118 endwise until head 106 is located properly in the tempering section of the delivery conduit. There it can be maintained removably in position by locking the appropriate one of the notches in arm 122 over the end of a detent 136 fixed to frame 8.

*Operation*

The operation of the presently described apparatus for manufacturing artificial flowers from plastic materials is as follows:

A quantity of synthetic plastic, ceramic material, royal icing or other plastic substance is placed in pressure vessel 10. Pressure equalizing lid 28 is placed over the material and cover 20 bolted across the vessel. Water or other heat exchange medium at the desired temperature is circulated through chamber 16.

Air or other gas under pressure is applied behind the plastic material by introducing it through line 24. This tends to drive the plastic material through outlet 30 and into L-shaped delivery conduit 32.

To make plastic flowers, the operator seats himself adjacent the apparatus. In one hand he holds a spindle or rose nail 140, FIG. 8, and with the other he operates lever 101 of FIG. 7, if the apparatus is valved manually, or microswitch 94 of FIG. 1, if the operation of the valve is electrically controlled.

In the latter case, closing switch 94 energizes solenoid-operated valve 96. This in turn admits air under pressure into air cylinder 60, retracting the piston thereof and accordingly withdrawing sliding valve gate 52 from across die opening 50. Thereupon a ribbon of plastic material is extruded from the die opening. The length of the ribbon is determined by the operator, since at the desired moment of extrusion he may open microswitch 94, thereby closing valve 96 and cutting off the flow of compressed air to cylinder 60. Thereupon spring 72 will force the sliding gate 52 across opening 50, severing the ribbon already extruded and closing off the opening.

As the ribbon segment is extruded from the die opening, the operator engages it with the rose spindle, turning the latter and wrapping the segment about the spindle. The process is repeated, another ribbon segment being extruded and wrapped about the spindle, in part overlapping the segment already deposited.

By a skillful series of manipulations, rotating the spindle and changing its angular relation to the die opening, it is possible to build up on the spindle an artificial rose or other flower in the manner illustrated in FIG. 8. As each flower is completed, it is stripped from the spindle by pulling the later through a restricted opening on a perforated drying board. This sequence can be carried out very rapidly, it being possible for a trained operator to make 400 or more roses per hour.

As the work progresses, the consistency of the royal icing or other plastic material is maintained at an optimum value by stirring it continuously with agitator 106. In addition, its consistency and qualities of plastic flow and setting may be varied and controlled by moving the agitator to various positions lengthwise of the conduit. This is accomplished by moving notched lever 122 and the associated lever assembly to the right or left, as viewed in FIG. 1, thereby contemporaneously moving shafts 102, 118 in an axial direction, until the agitator head has been located in the desired spot. The notched lever 122 then is locked against detent 136 to hold the agitator head in its new operating position.

It accordingly will be seen that there is provided an apparatus in which the several objects of this invention are achieved and which is well adapted to meet the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Apparatus for manufacturing plastic flowers and like articles which comprises:
   (a) a stationary vessel adapted to contain a quantity of a plastic material and having an outlet,
   (b) a delivery conduit connected to the outlet,
   (c) an extrusion head connected to the conduit,
   (d) die means on the extrusion head adapted to pass plastic material and to shape it in ribbon segments of predetermined cross sectional configuration,
   (e) pressure applying means for applying pressure to the material, forcing it through the conduit,
   (f) valve means working across the die means for determining the length of the ribbon segments extruded thereby,
   (g) and agitating means in the conduit adjacent the extrusion head for agitating the plastic material preliminary to its extrusion through the die.

2. The apparatus of claim 1 wherein the vessel is arranged vertically with the conduit at its bottom, the conduit being of substantial diameter to pass the plastic material freely and being substantially L-shaped to provide a horizontal section connected to the extrusion head, the die means being directed laterally with respect to the longitudinal axis of the conduit.

3. The apparatus of claim 1 wherein the agitating means comprises a rotatably mounted shaft extending through the side wall of the conduit means in sealed relation thereto, a toothed agitating head on the inner end of the shaft, and drive means connected to the outer end of the shaft for rotataing the shaft at a predetermined rotational velocity.

4. The apparatus of claim 1 including shifting means engaging the agitating means for shifting the position of the agitating means toward and away from the extrusion head as required to provide a plastic mixture tempering chamber of preselected extent.

5. The apparatus of claim 1 wherein the conduit is substantially L-shaped with the extrusion head connected to one segment of the L, and the agitating means comprises a rotatably mounted shaft extending through the side wall of the conduit means in sealed relation thereto and extending coaxially thereinto, an agitator head at the inner end of the shaft, drive means connected to the outer end of the shaft for rotating it at a predetermined velocity, and lever means connected to the shaft for shifting it to a predetermined one of a plurality of longitudinal extensions, thereby positioning the agitator head on the shaft a preselected distance from the extrusion head on the conduit.

6. The apparatus of claim 5 wherein the lever means comprises a first lever arranged substantially normal to the shaft, collar means interconnecting one end of the first lever to the shaft, mounting means for mounting the other end of the lever on a structural member, a second lever pivotally connected at one of its ends at an intermediate point of the first lever, the second lever having along its longitudinal edge a plurality of spaced notches, and stationary detent means dimensioned for insertion in a selected one of the notches.

7. The apparatus of claim 1 wherein the extrusion head is provided with a slot adjacent the die and wherein the valve means comprises a plate positioned in reciprocative sliding relation to the inner side wall of the extrusion head, a pin extending from the outer face of the plate through the slot in the extrusion head, a guide fixed to the pin to guide the sliding movement of the plate between positions of die opening and die closure, and operator means connected to the pin for reciprocating the plate between said positions of die opening and die closure.

8. The apparatus of claim 7 wherein the operator means comprises a reciprocative pneumatic cylinder connected to the pin for reciprocating the plate between said positions of die opening and die closure.

References Cited

UNITED STATES PATENTS

| | | | |
|---|---|---|---|
| 1,296,107 | 4/1919 | Oakley | 18—3.5 |
| 1,363,602 | 12/1920 | Kost | 18—3.5 |
| 1,382,397 | 6/1921 | Whitehouse | 18—3.5 |
| 1,399,849 | 12/1921 | Chapin | 18—3.5 |
| 1,430,363 | 9/1922 | Dolley | 18—12 X |
| 1,557,760 | 10/1925 | Greene. | |
| 1,663,206 | 3/1928 | MacRae. | |
| 1,902,987 | 3/1933 | Bell | 18—35 X |
| 2,556,609 | 6/1951 | Arkless | 18—35 X |
| 2,671,939 | 3/1954 | Everhart et al. | 15—12 X |
| 2,731,699 | 1/1956 | Dubbs. | |
| 2,904,953 | 9/1959 | Groombridge et al. | 264—103 |
| 2,995,159 | 8/1961 | Berggren | 18—3.5 X |
| 3,020,907 | 2/1962 | Lease | 18—3.5 X |
| 3,059,276 | 10/1962 | Yokana | 18—12 |
| 3,112,525 | 12/1963 | Moziek | 18—12 |
| 3,114,593 | 12/1963 | Griset et al. | 264—103 |

WILLIAM J. STEPHENSON, *Primary Examiner.*